(12) United States Patent
Wormall

(10) Patent No.: US 7,793,991 B2
(45) Date of Patent: Sep. 14, 2010

(54) PIPE CONNECTOR

(76) Inventor: Shane John Wormall, 21-23 Eva Street, Maddington WA (AU) 6019

( * ) Notice: Subject to any disclaimer, the term of this patent is extended or adjusted under 35 U.S.C. 154(b) by 0 days.

(21) Appl. No.: 10/221,038

(22) PCT Filed: Mar. 9, 2001

(86) PCT No.: PCT/AU01/00256

§ 371 (c)(1),
(2), (4) Date: Jan. 22, 2003

(87) PCT Pub. No.: WO01/66863

PCT Pub. Date: Sep. 13, 2001

(65) Prior Publication Data

US 2003/0141717 A1    Jul. 31, 2003

(30) Foreign Application Priority Data

Mar. 9, 2000    (AU) .................................. PQ6116

(51) Int. Cl.
*F16L 41/02* (2006.01)
*F16L 13/02* (2006.01)

(52) U.S. Cl. ................. 285/192; 285/288.1; 285/126.1; 52/20; 52/567.1; 137/372

(58) Field of Classification Search ......... 285/189–192, 285/288.1, 126.1, 129.1; 220/567.1; 52/20; 404/25; 137/363, 372, 373
See application file for complete search history.

(56) References Cited

U.S. PATENT DOCUMENTS

| | | | | |
|---|---|---|---|---|
| 96,555 A | * | 11/1869 | Dayton | ........................ 285/189 |
| 1,182,710 A | * | 5/1916 | Rowell | ........................ 285/210 |
| 1,457,183 A | * | 5/1923 | Mitchell | ..................... 285/189 |
| 1,911,654 A | * | 5/1933 | Taylor | ........................ 285/189 |
| 2,807,478 A | * | 9/1957 | Hermann et al. | ............... 285/5 |
| 3,062,566 A | * | 11/1962 | Coburn | ........................ 60/266 |
| 3,186,431 A | * | 6/1965 | Moore | ..................... 137/561 R |
| 3,392,994 A | * | 7/1968 | Moore | ................... 285/133.11 |
| 3,499,669 A | * | 3/1970 | Hait | ........................... 285/189 |
| 3,715,958 A | * | 2/1973 | Crawford et al. | ............... 52/21 |
| 3,814,891 A | * | 6/1974 | Agrati | ......................... 219/67 |
| 4,234,217 A | * | 11/1980 | Sakamoto et al. | ......... 285/125.1 |
| 4,239,263 A | * | 12/1980 | George | ..................... 285/125.1 |
| 4,302,499 A | * | 11/1981 | Grisch | ........................ 442/268 |
| 4,315,531 A | * | 2/1982 | Gerhard | ....................... 141/98 |
| 4,450,613 A | * | 5/1984 | Ryan et al. | ............... 29/890.14 |

(Continued)

FOREIGN PATENT DOCUMENTS

AU    41266/85    10/1985

(Continued)

*Primary Examiner*—James M Hewitt
(74) *Attorney, Agent, or Firm*—Nixon & Vanderhye P.C.

(57) ABSTRACT

A pipe connector (10) including a joining portion (12) having a port (14) for connection of a first pipe thereto, the joining portion also having a wall for connection of a second pipe thereto, the second pipe being able to be connected to the wall by boring a hole through the wall and bonding the second pipe thereto, the wall having a shape such that the pipe may be bonded to the wall at a plurality of angles with respect to the port, whereby, in use, the pipe connector (10) can connect the first pipe to the second pipe at a plurality of angles with respect to each other.

13 Claims, 9 Drawing Sheets

U.S. PATENT DOCUMENTS

| | | | | |
|---|---|---|---|---|
| D274,549 S | * | 7/1984 | Ryan | D23/263 |
| 4,663,036 A | * | 5/1987 | Strobl et al. | 405/52 |
| 5,017,313 A | * | 5/1991 | Trimble | 264/32 |
| 5,361,799 A | * | 11/1994 | Chilton et al. | 137/363 |
| 5,386,669 A | * | 2/1995 | Almeida | 52/19 |
| 5,490,419 A | * | 2/1996 | Webb | 73/40.5 R |
| 5,772,361 A | * | 6/1998 | Gavin | 405/36 |
| 5,934,315 A | * | 8/1999 | Braswell et al. | 137/363 |
| 6,371,526 B1 | * | 4/2002 | Ekholm | 285/148.23 |

FOREIGN PATENT DOCUMENTS

| | | | |
|---|---|---|---|
| DE | 2536849 | A | 3/1976 |
| DE | 2755804 | A | 3/1976 |
| DE | 19603254 | A | 8/1996 |
| EP | 552710 | B | 7/1993 |
| EP | 754900 | B | 1/1997 |
| JP | 3-181693 | * | 8/1991 |
| JP | 11140950 | | 5/1999 |
| WO | 9957479 | A | 11/1999 |
| WO | 0006830 | A | 2/2000 |

* cited by examiner

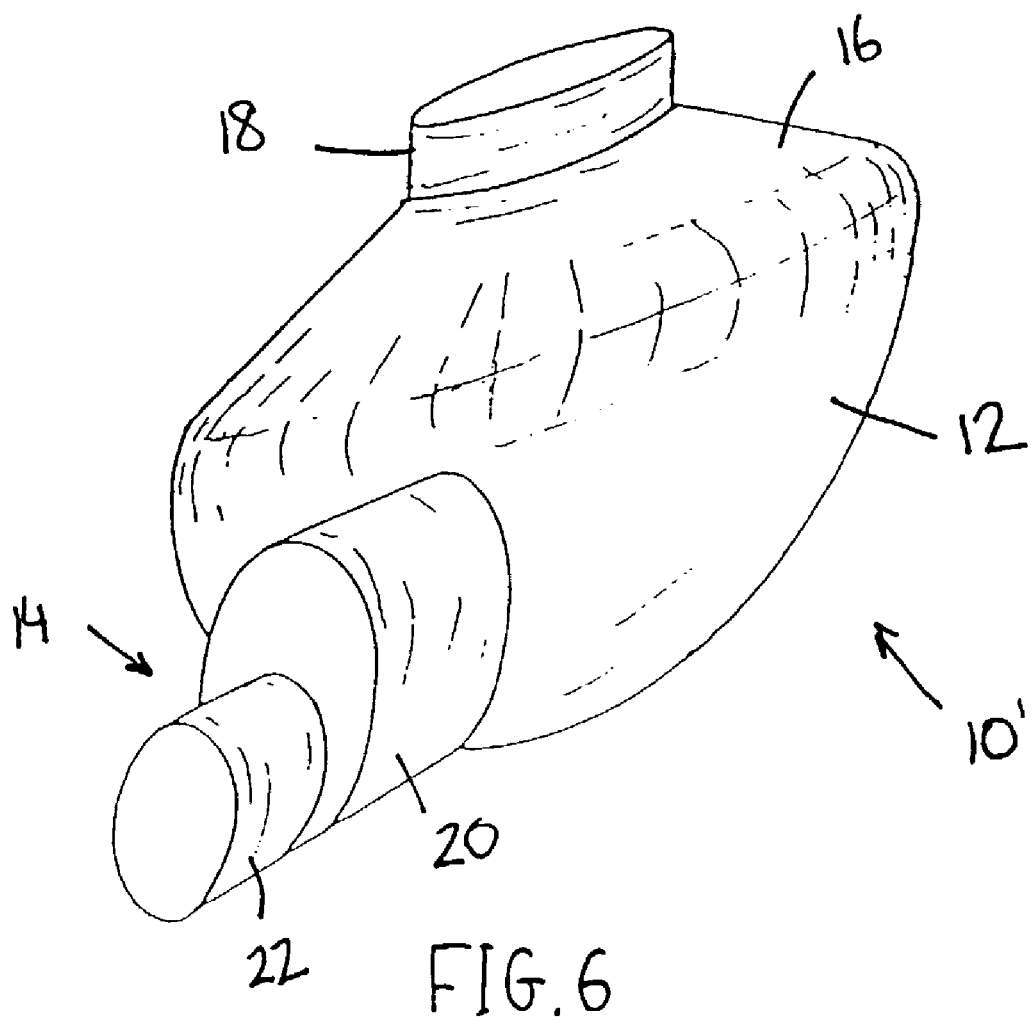

PIPE CONNECTOR

CROSS-REFERENCE TO RELATED APPLICATIONS

This application is a U.S. national phase of PCT/AU01/00256 filed Mar. 9, 2001, which in turn claims priority of Australian application Serial No. PQ 6116 filed Mar. 9, 2000, the entire content of each of which is hereby incorporated by reference in this application.

FIELD OF THE INVENTION

The present invention relates to a pipe connector for connecting together pipes. In particular, although not exclusively, the present invention relates to a pipe connector in the form of a sewer maintenance shaft.

BACKGROUND OF THE INVENTION

Present sewer maintenance shafts are in the form of a joining chamber having at least an inlet port, an outlet port and a riser extending upwardly from the joining chamber. The sewer maintenance shafts are generally moulded of plastics in a predefined shape. In particular, the angle between the inlet port and the outlet port is fixed. Therefore, a different shape of maintenance shaft is required for different angles between the inlet and outlet pipes. To simplify the number of maintenance shafts that are moulded, they are cast with preset angles, such as 180°, 90° and 135°.

Often, however, the angle between the pipes does not correspond with the prefabricated angles. This results in the need for angled and elbow pipes in order to change the direction of the pipe to suit the sewer maintenance shaft. This is expensive and time consuming.

The present invention seeks to provide a pipe connector that overcomes the above mentioned problem.

SUMMARY OF THE INVENTION

According to the present invention there is provided a pipe connector including a joining portion having a port for connection of a first pipe thereto, the joining portion also having a wall for connection of a second pipe thereto, the second pipe being able to be connected to the wall by boring a hole through the wall and bonding the second pipe thereto, the wall having a shape such that the pipe may be bonded to the wall at a plurality of angles with respect to the port, whereby, in use, the pipe connector can connect the first pipe to the second pipe at a plurality of angles with respect to each other depending on the position of connection of the second pipe to the wall. The second pipe is flush with the wall at each of the positions.

Preferably, the wall defines a cavity in the joining portion, the cavity in fluid communication with the first and second pipes.

Preferably, the joining portion is of a symmetrical shape. In one embodiment the joining portion is a hemisphere or a sphere. In a second embodiment the joining portion is in the form of a cylinder having a substantially vertical longitudinal axis.

In yet another embodiment, the joining portion is a polyhedron. In this embodiment, it is more preferable that the joining portion is a regular polygon in horizontal cross-section. The regular polygon may be a hexagon or an octagon.

Preferably, the pipe connector is in the form of a maintenance shaft having a riser extending vertically from the joining portion.

Preferably, a third pipe may be connected to the wall by boring a second hole through the wall and bonding the third pipe thereto, whereby the third pipe may be connected to the first and second pipes at a plurality of angles relative to one another depending on the position of the connection of the third pipe to the wall. The third pipe is flush with the wall at each of the positions.

Also according to the present invention there is an underground pipe connector for connecting a first pipe to a second pipe having an end of predetermined shape, the pipes being adapted for liquid to flow therethrough, the pipe connector comprising:

a liquid receiving vessel comprising a joining portion having a wall, the vessel having an outlet coupling for connection to the first pipe, the outlet coupling extending from a substantially lowermost point of the vessel so as to allow, in use, liquid to flow from the vessel through the outlet coupling into the first pipe under gravity, wherein the wall is shaped to provide a plurality of positions in at least one substantially horizontal plane passing through the joining portion at which the second pipe may be connected, wherein the wall is shaped such that during use when the second pipe is disposed in one of said at least one horizontal plane the end of the second pipe is able to fit flush with the wall at any one of a plurality of different angles defined between the second pipe and a vertical plane passing through the joining portion;

wherein the wall is adapted for boring a hole therethrough at each of the positions for connecting the second pipe to the vessel with the interior of the second pipe in communication with the interior of the vessel by bonding the second pipe to the wall about the hole.

Typically when the first pipe is connected it is parallel with or coincides with the vertical plane.

The wall of the pipe connector is typically formed of a single piece of moulded plastics.

Also according to the present invention there is provided a method of connecting a first pipe to a second pipe, the method comprising:

providing a pipe connector according to one aspect of the invention connecting the first pipe to the outlet coupling so as to allow liquid to drain from the vessel through the outlet coupling into the first pipe under gravity;

boring a first hole in the wall at a first position selected such that the end of the second pipe will fit flush with the wall at the first hole and bonding the second pipe to the wall about the hole.

Preferably the method further comprises boring a second hole in the wall a second position selected such that an end of a predetermined shape of a third pipe will fit flush with the wall at the second hole bonding the third pipe to the wall about the hole.

Typically the position is selected so as to dispose the second pipe at a desired one of the plurality of angles between the second pipe and the vertical plane passing through the joining portion when the first pipe and the second pipe are connected together by the pipe connector.

Preferably the method further comprises boring the first hole in the wall at a position selected according to a desired angle between the first pipe and the second pipe.

Typically the second position is selected so as to dispose the third pipe at a second desired one of the plurality of angles between the third pipe and the vertical plane passing through the joining portion when third pipe is connected to the pipe connector.

Typically the method further comprises boring the second hole in the wall at a position selected according to a desired angle between the first pipe and the third pipe.

Typically the wall of the pipe connector is curved in shape to provide a continuous range of positions in the at least one horizontal plane at which the second pipe may be bonded to the wall wherein the curved shape of the wall is such that during use when the second pipe is disposed in one of said at least one horizontal plane the end of the second pipe is able to fit flush with the wall at any one of a continuous range of angles defined between the second pipe and a vertical plane passing through the outlet coupling.

Thus the plurality of positions will comprise the continuous range of portions and the plurality of angles will comprise the continuous range of angles.

In a preferred embodiment the wall is curved horizontally and vertically.

In preferred embodiments the outlet coupling extends substantially tangentially from the lowermost point of the curved wall. Usually the outlet coupling extends from the vessel so that a line along an external surface of the outlet coupling is substantially tangential to an external surface of the curved wall at a substantially lowermost point of the external surface.

It is also usual for a lowermost line along the inside surface of the outlet coupling to be substantially tangential to the inside of the curved wall at a substantially lowermost point of the inside of the vessel.

Typically the outlet coupling is arranged to connect the first pipe in a substantially horizontal orientation when installed for use.

In preferred embodiments the entire upwardly facing surface of the wall is sloped so as to direct liquid into the outlet coupling under gravity in use.

Typically the wall is shaped to connect the second pipe thereto at a height differential relative to the first pipe.

The wall is shaped such that the cross sectional area that is enclosed by the wall varies with distance from the outlet coupling in a direction in line with the outlet coupling.

Preferably for at least one substantially vertical plane passing through the joining portion, the wall has a shape such that during use when the second pipe is disposed in the vertical plane, the second pipe is able to fit flush with the all at any one of a plurality of angles defined between the second pipe and a horizontal plane passing through the joining portion by boring a hole in the wall and bonding the second pipe to the wall about the hole.

Preferably the wall is shaped such that selection of a position on the wall at which the second pipe is bonded to the wall during use determines the angle between the second pipe and a vertical plane passing through the joining portion when the second pipe has a predetermined end shape and the second pipe is bonded to the wall so as to fit flush with the wall.

Typically, prior to connection of the second pipe, the riser and the outlet coupling are the only apertures in the pipe connector.

According to the present invention there is provided an underground system for transporting waste water, said system comprising:
    a first pipe;
    a second pipe having a predetermined end shape;
    a pipe connector according to an aspect of the invention the joining portion comprising a hole bored in the wall at one of the positions selected according to a desired angle between the first pipe and the second pipe and at a position on the wall selected such that the end of the second pipe will fit flush with the wall at the first hole;
    wherein the first pipe is connected to the outlet coupling so as to allow liquid to flow from the vessel through the outlet coupling into the first pipe under gravity,
    wherein the second pipe is bonded to the wall about the hole such that the interior of the second pipe is in communication with the interior of the vessel.

In a preferred embodiment the system further comprises:
    a third pipe; and
    another hole in the wall at another position selected according to a desired angle between the first pipe and the third pipe;
    wherein the third pipe is bonded to the wall about the other hole such that the interior of the third pipe is in communication with the interior of the vessel.

BRIEF DESCRIPTION OF DRAWINGS

In order to provide a better understanding, preferred embodiments of the present invention will now be described in detail, by way of example only, with reference to the accompanying drawings, in which;

FIG. 6 is an upper perspective view of an alternative embodiment of a pipe connector according to the present invention;

DETAILED DESCRIPTION OF PREFERRED EMBODIMENTS

Figure 1:
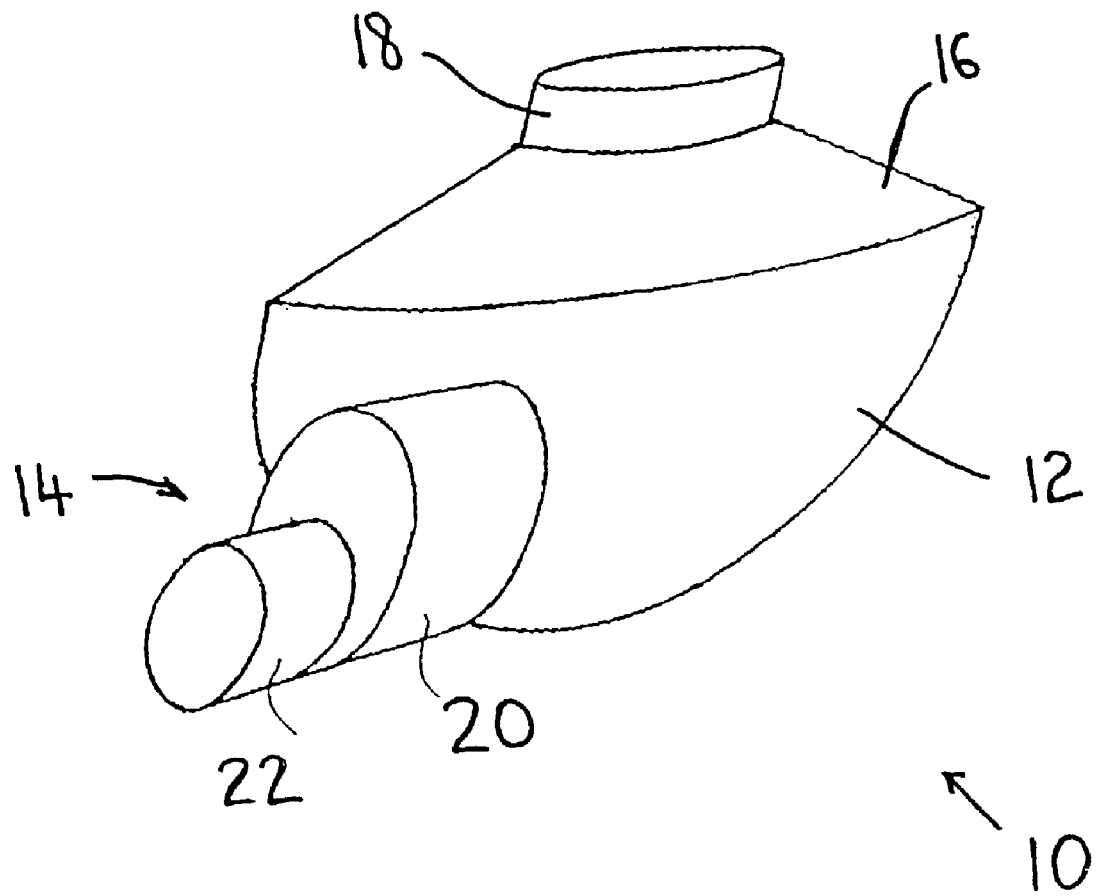
FIG. 1 is an upper perspective view of a pipe connector in accordance with the present invention.
Figure 2:
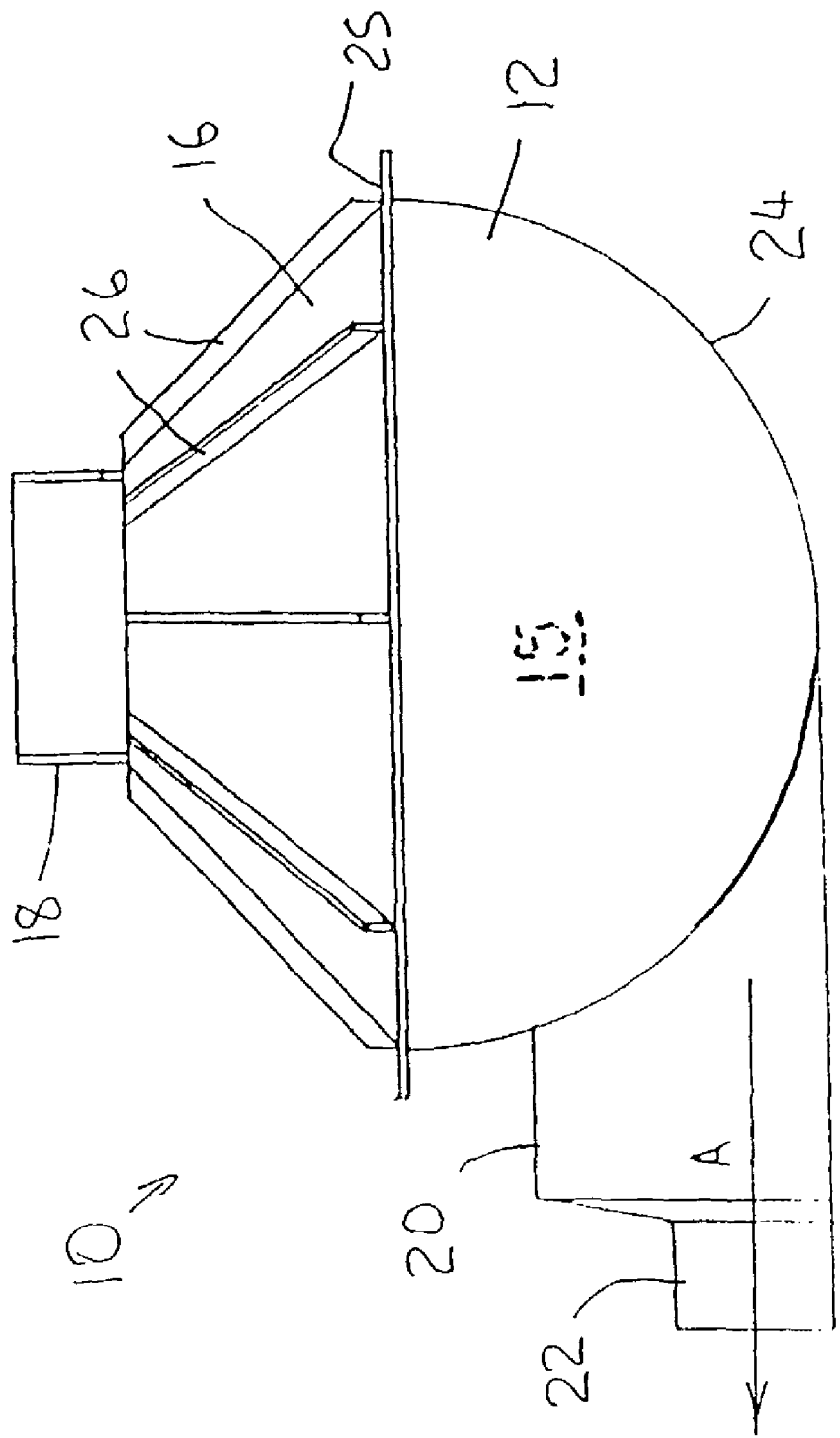
FIG. 2 is a side elevation of the pipe connector of FIG. 1.
Figure 3:
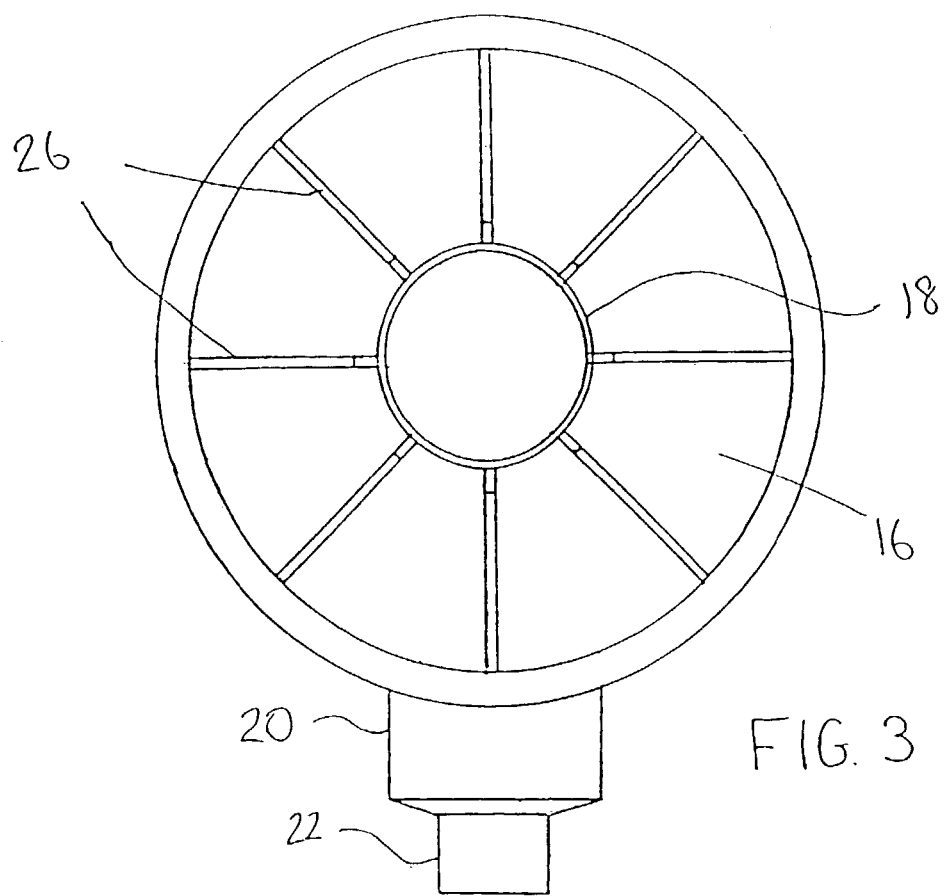
FIG. 3 is a plan end view of the pipe connector of FIG. 1.
Figure 4:
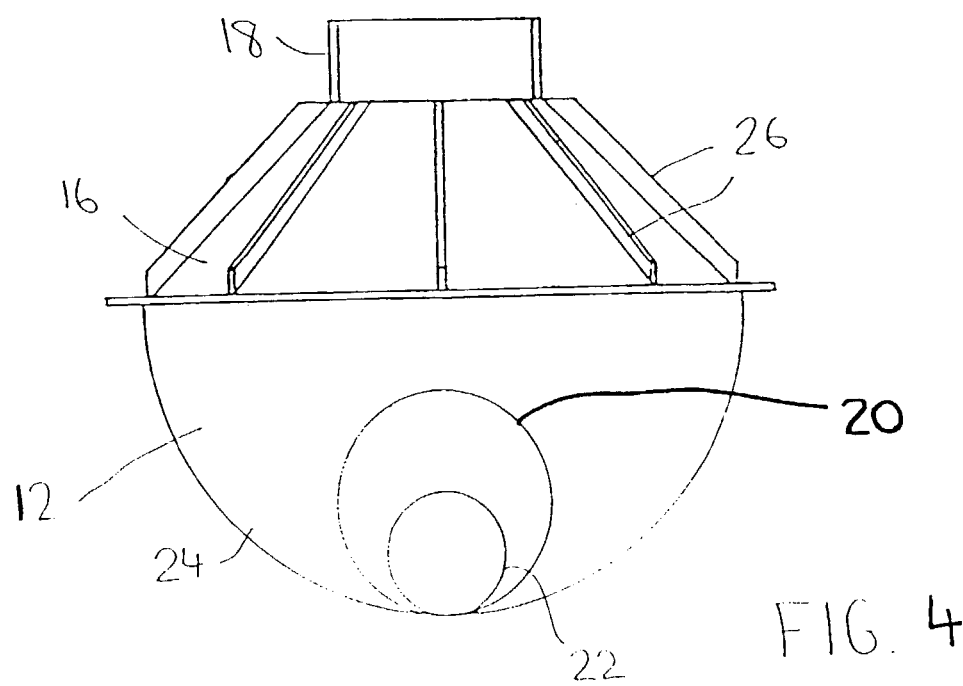
FIG. 4 is a front elevation of the pipe connector of FIG. 1.

Referring to FIGS. 1 to 4, there is shown a pipe connector in the form of a sewer maintenance shaft 10, comprising a liquid receiving vessel which includes an inverted hemispherical joining portion 12. A port 14 horizontally extends substantially from the base of the hemispherical joining portion 12. The joining portion 12 has a curved slopping wall due to the hemispherical shape. The bottom of the slope meets the opening into the port 14. The wall curves through both a horizontal plane and a vertical plane. The port 14 includes a large diameter section 20 that extends from the joining portion 12, which then is reduced to a smaller diameter section 22. The smaller diameter section 22 is of a diameter suitable for connection to a first pipe. Generally, the first pipe will be an outlet pipe with the direction of flow through the maintenance shaft 10 indicated by the arrow A in FIGS. 2 and 5. A large diameter pipe may be connected to the large diameter section 20. In this case the small diameter section 22 will be removed. Sections 20 and 22 form an outlet coupling to which the first pipe may be connected.

The joining portion 12 includes a wall 24 defining a cavity 15 within the liquid receiving vessel. The port 14 is in fluid communication with the cavity 15. The entire upwardly facing surface is downwardly sloped towards the port 14. In use, liquid within the joining portion 12 can flow down the sloped wall to the bottom of the joining portion and then into the port 14, under gravity.

Extending upwardly from the cavity is a riser 18. The riser 18 is of a diameter suitable for connection to an inspection shaft. Connecting the riser 18 to the joining portion 12 is a frustoconically shaped portion 16. The portion 16 includes strengthening ribs 26 in FIGS. 2-4. At the interface between the portion 16 and the joining portion 12 is a ledge 25 suitable for assisting in lifting and moving the pipe connector 10.

Figure 5A:
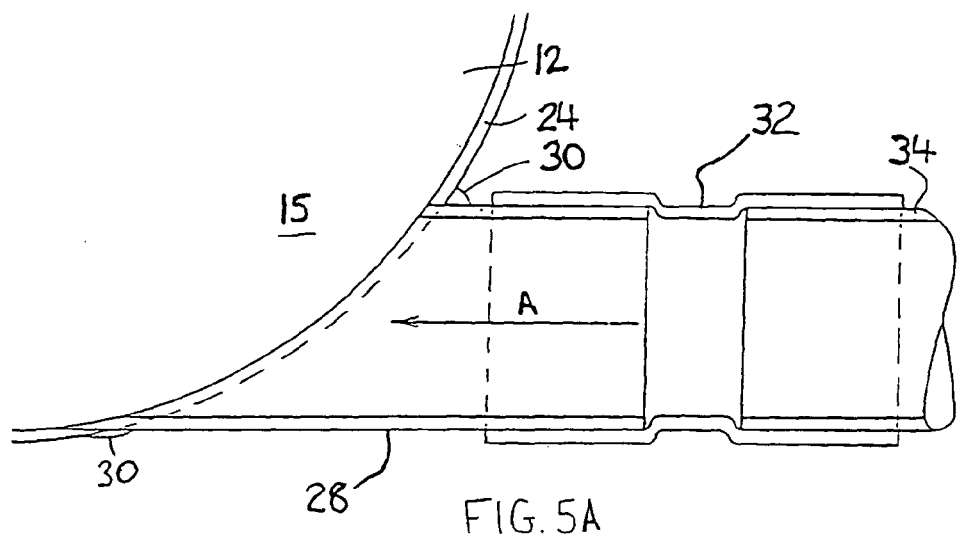
FIG. 5A is a cross-sectional view of the bonding of a pipe to a joining portion of the pipe connector of FIG. 1.

Referring to FIG. 5A, there is shown a second pipe 28 which has been connected to the joining portion 12. The wall 24 of the joining portion 12 has been bored through to produce a hole having a size equal to the diameter of the pipe 28. The pipe 28 is then inserted into the bored hole and bonded by a bonding material 30, such as welded plastic. The pipe 28 is flush with the inside of the wall 24. That is, it does not project inside the joining portion 12. The pipe 28 is then in fluid communication with the cavity 15. The bonding 30 sealingly connects the pipe 28 with the joining portion 12. The pipe 28 is shown connected to a standard connector 32 which is, in turn, connected to another pipe 34. The pipe 28 generally is an inlet pipe. It can be seen that the pipe 28 is not at the bottom of the joining portion 12 and thus will be upwardly offset from the first pipe when connected to the port 14. The angle between the first pipe and the second pipe 28 is determined due to the position on the wall of the joining portion 12 at which the pipe 28 is connected to the joining portion 12. In other words moving the pipe 28 through a horizontal plane and varying the position of connection of the second pipe to the wall will vary the angle.

Figure 5B:
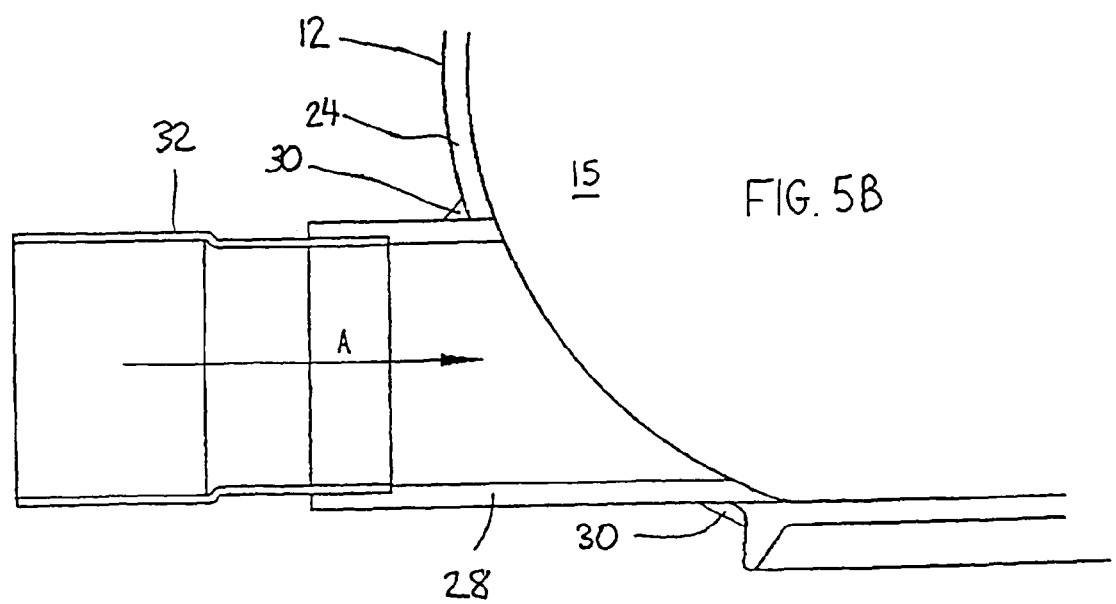
FIG. 5B is a cross-sectional view of an alternative connection of a pipe to a joining portion of the pipe connector of FIG. 8.

FIG. 5B shows a similar arrangement to FIG. 5A. The main difference is that the connector 32 fits inside the pipe 28 rather than over the outside of the pipe 28, as is the case in FIG. 5A.

Figure 7:
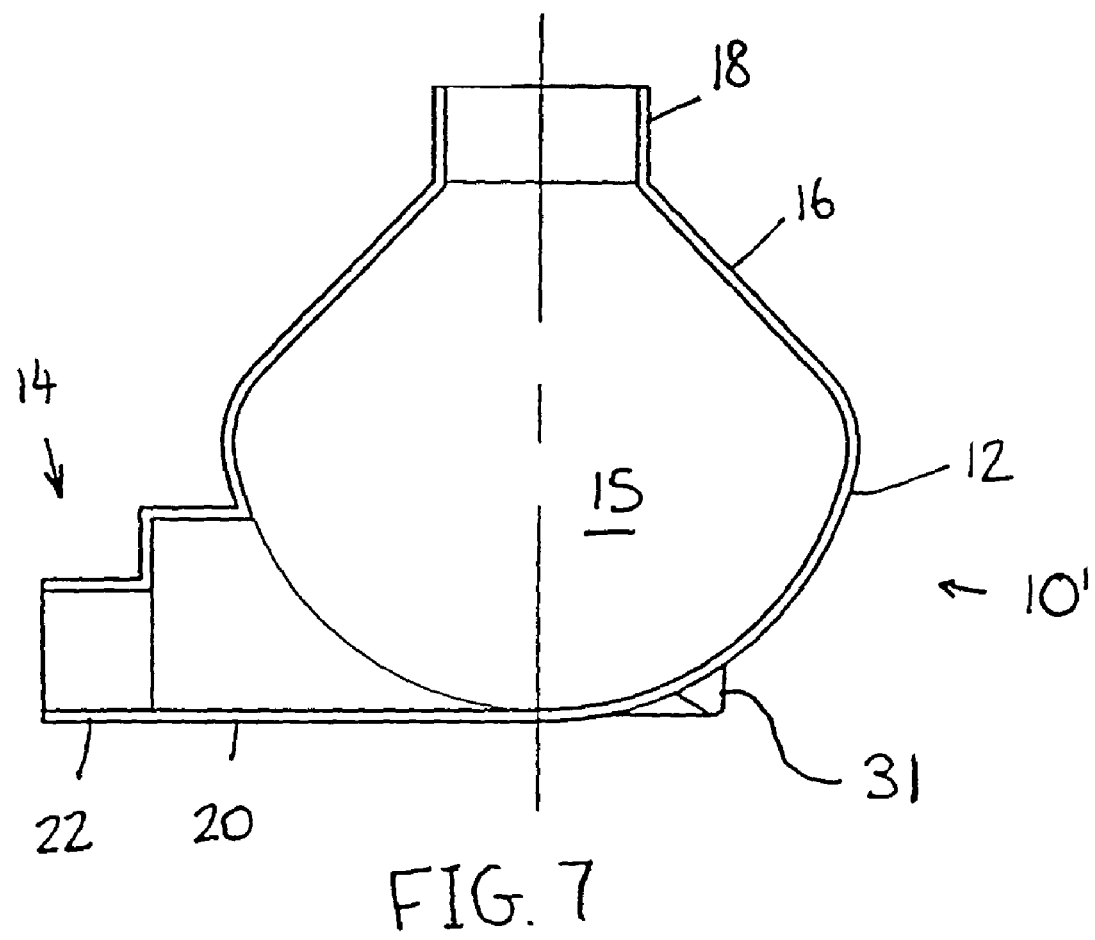
FIG. 7 is a cross-sectional view of the pipe connector of FIG. 6.

Referring to FIG. 6, an alternative form of pipe connector 10' is shown. The main difference with this pipe connector 10' and the previous embodiment is that the interface between the joining portion 12 and the portion 16 does not include a ledge 25, and the portion 16 is rounded. The pipe connector 10' is moulded from a single piece of plastics material. In FIG. 7, a base section 33 is shown to assist the pipe connector 10' to stand on a flat surface. It can be seen clearly in this figure that the port 14 extends from the lowermost point of the joining portion 12. It can also be seen that if a line 46 were to be drawn through the central axis of the section 22 and extended through the joining portion, then it would form a chord through the joining portion 12 of a length less than the diameter of the joining portion 12.

Figure 8:
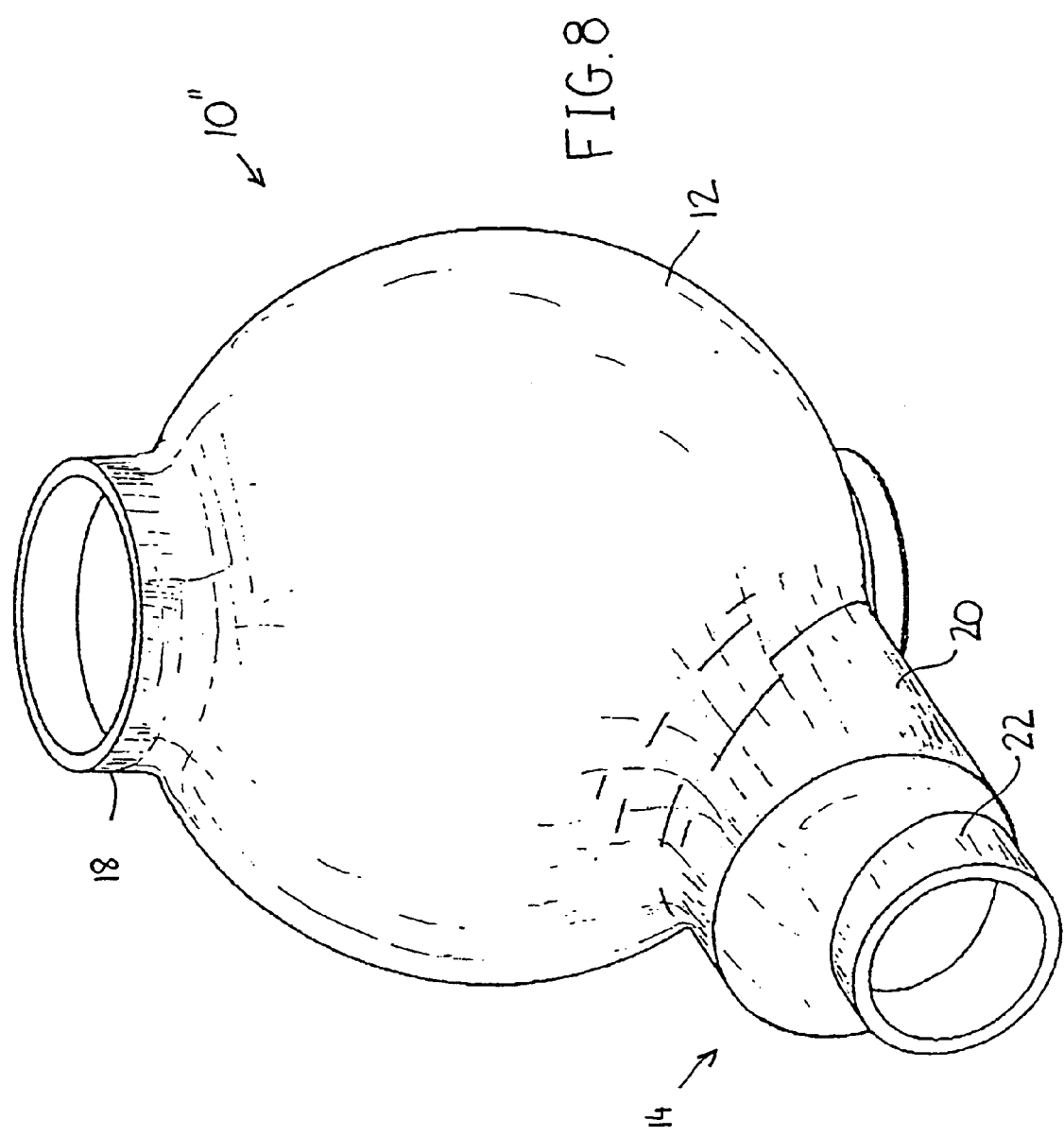
FIG. 8 is an upper perspective view of another alternative embodiment of a pipe connector according to the present invention.

FIG. 8 shows yet another preferred embodiment of a pipe connector 10". In this instance the joining portion 12 is substantially spherical with the riser 18 connecting directly to the joining portion 12. The spherical joining portion 12 allows a second pipe to be connected to the joining portion 12 at a plurality of angles relative to a horizontal plane. As depicted in all of the embodiments shown in the drawings, the port 14 extends from the lower most point of the joining portion 12 so that liquid will flow into the port 14 under the influence of gravity.

Figure 9:
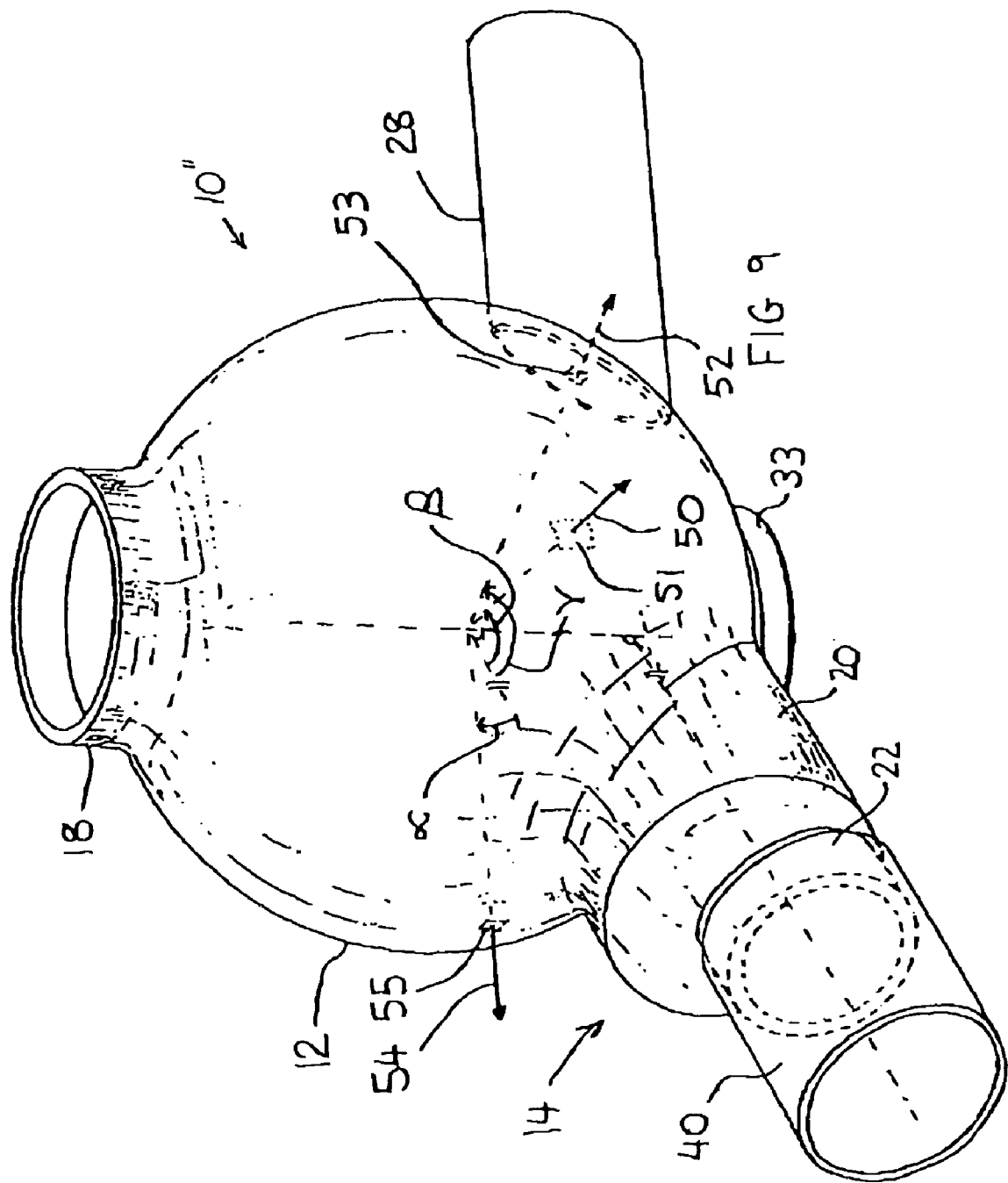
FIG. 9 is an upper prespective view of the pipe connector of FIG. 8 shown connecting two pipes together.

FIG. 9 shows the pipe connector 10" connected to a first pipe 40 and a second pipe 28. The first pipe 40 is connected to the small diameter section 22 of the port 14.

The second pipe 28 is connected to the joining portion 12 at an angle relative to the first pipe (and the port 14) of about 135° through the horizontal plane.

Figure 10:
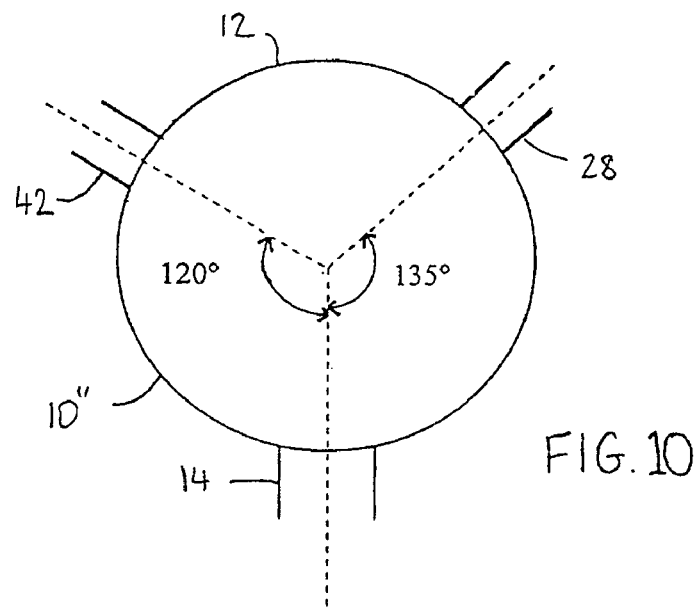
FIG. 10 is a schematic top view of the pipe connector of FIG. 8 connecting three pipes together, with a riser not shown for clarity.

FIG. 10 shows two examples of different angles at which pipes can be connected relative to the port 14. In this example pipe 28 is at 135° to a vertical plane through the port 14. A third pipe 42 is connected to the joining portion 12 at a position on the wall which orients the third pipe 42 at 120° to the vertical plane through the port 14. It can be seen that the position of the connection to the pipe 28 is further away from the port 14 than the position of the connection to pipe 42.

Figure 11:
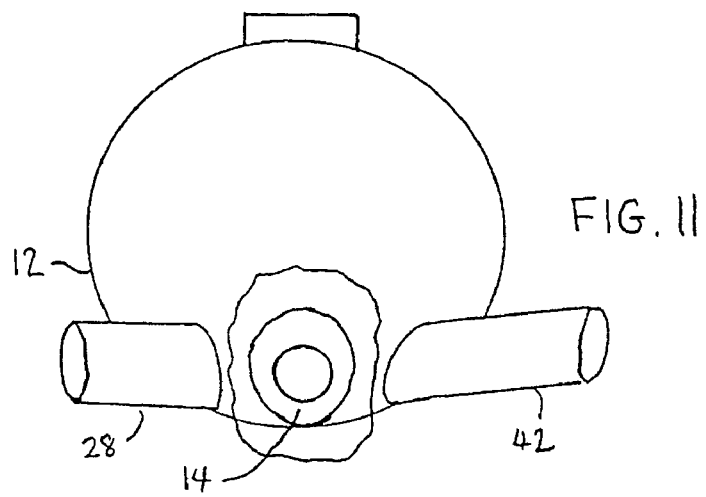
FIG. 11 is a schematic rear elevation of the pipe connector of FIG. 8 connecting three pipes together, with a partial cutout showing part of the inside of the pipe connector.

FIG. 11 shows the inside of the joining portion 12 and in particular it can be seen that the port 14 extends from the very bottom of the joining portion 12 so that liquid entering the connector 10" from the pipes 28 and 42 will be directed toward and then into the port 14. It can also be seen that the pipes 28 and 42 are relatively higher than the port 14.

Figure 12:
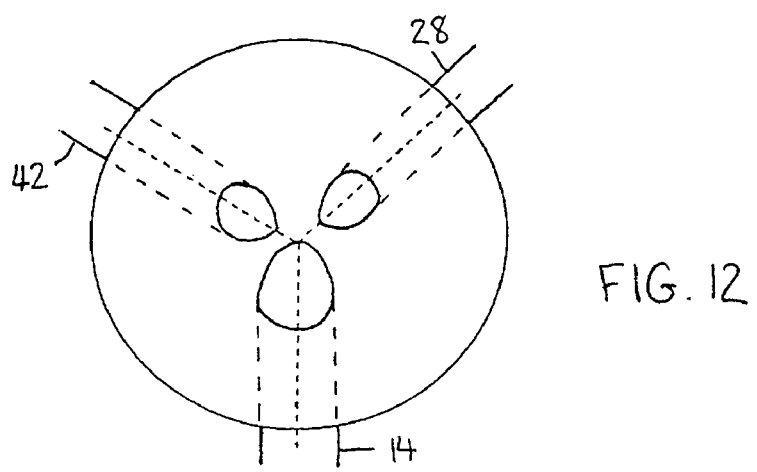
FIG. 12 is a schematic cross sectional top view of the pipe connector similar to FIG. 10.

FIG. 12 shows the opening to the port 14 from the inside of the joining portion 12 and also shows the holes which allow the pipes 28 and 42 to communicate with the inside of the joining portion 12.

It is noted that due to the curved shape of the wall of the joining portion 12 a normal 50 to the surface at one position 51 will be oriented differently to a normal 54 to the surface at another position 55. This is illustrated by normal 54 being a degrees from the first pipe 40 through a horizontal plane, normal 50 being β degrees from the first pipe 40 through the horizontal plane, and normal 52 at the centre of the hole 53, around which the second pipe 28 is connected, being γ degrees from the first pipe 40 through the horizontal plane.

The curved shape of the wall also has the effect that if a cross section is taken through the joining portion 12 at a certain distance from the port 14 and the area determined, then moving away from the port 14 in a direction in line with the port 14 will result in the cross sectional area changing.

Due to these features a range of positions are available to connect the second pipe to the joining portion 12. Each different position has a different point of view in relation the port 14 and in particular moving horizontally around the wall produces an increase or decrease in the angle at which the second pipe, when connected at that position, will be oriented relative to the port 14. It is therefore clear to the skilled addressee that a change in the position of the place of connection varies the angle between the second pipe and the first pipe when they are connected to the port 14.

It will also be clear that the end of the second pipe will be flush with the wall at all of these positions without the need to modify the shape of the end.

The method of use and operation of the present invention will now be described with reference to the accompanying drawings.

The angle between an inlet pipe and an outlet pipe (which the pipe connector connects together) as they will be installed for use is measured. This angle is then used to determine the position of the bored hole so that the pipe 28 and the smaller diameter section 22 of the port are arranged to be at the same angle as the angle measured between the pipes. The hole is then bored in the wall 24 of the joining portion 12 and the pipe 28 bonded to the joining portion. The sewer maintenance shaft 10 may then be bonded to the outlet pipe. The inspection shaft may be bonded to the riser 18.

While it is clear that the pipe connector can connect pipes that are aligned, it will be clear to the skilled addressee that the present invention has at least the following advantages:

a) The pipe connector is suitable for connecting pipes having a range of angles therebetween, especially when one or more required angles do not correspond with standard pipe connector prefabricated angles of 180° 90° and 135° ; and b) Only one type of pipe connector need be produced for each diameter of pipe rather than a series of pipe connectors each having a particular angle between the inlet and outlet port.

It will also be clear to the skilled addressee that modifications and variations can be made to the present invention without departing from the basic inventive concept. Examples of such modifications are: the joining portion need not be hemispherical or spherical in shape, a vertically extending cylinder may be suitable; in fact, a number of symmetrical shapes would be suitable, including a polyhedron, or a regular polygon in horizontal cross-section, such as a hexagon or an octagon, thereby allowing a plurality of angles between the inlet and outlet pipes.

Such modifications and variations are intended to be within the scope of the present invention, the nature of which is to be determined from the foregoing description.

The invention claimed is:

1. An underground connector between a first pipe and a second pipe comprising:
    an inlet stub pipe for connection to the first pipe, the inlet stub pipe comprising a curved end surface;
    a connecting chamber comprising a spherical or part-spherical joining portion;
    an outlet stub pipe for connection to the second pipe, wherein the outlet stub pipe leads from a lowermost point of the chamber for receiving liquid flowing from the chamber under gravity in use;
    wherein the curved end surface and a wall of the joining portion are complementary in shape such that the end surface fits flush with the joining portion;
    wherein the inlet stub pipe is able to be bonded to the joining portion at a desired angle relative to the outlet stub pipe such that the desired angle matches an angle between the first pipe and the second pipe;
    wherein the joining portion is able to have a hole through the wall for allowing liquid in the inlet stub pipe to flow into the chamber under gravity in use.

2. A connector as claimed in claim 1, wherein the wall is shaped to provide a first plurality of positions in at least one substantially horizontal first plane passing through the joining portion at which the inlet stub pipe is connectable.

3. A connector as claimed in claim 2, wherein the wall of the joining portion is shaped such that during use when the inlet stub pipe is disposed so as to be connectable to the wall at each of the first positions the end of the inlet stub pipe is able to fit flush with the wall, and an axial length of the inlet stub pipe will be disposed at a respective one of a plurality of different angles relative to an axial length of the outlet stub pipe such that the desired angle is one of the plurality of a different angles.

4. A connector according to claim 3, wherein the wall of the joining portion is shaped to provide a second plurality of positions in a substantially horizontal second plane passing through the joining portion, which is different to the first plane, at which another inlet stub pipe is connectable,
    wherein the wall of the joining portion is shaped such that during use when an end of the other inlet stub pipe of predetermined curved shape, different to the end of the inlet stub pipe, is disposed so as to be connectable to the wall at one of the second plurality of positions, the end of predetermined shape of the other inlet stub pipe is able to fit flush with the wall and an axial length of the other inlet stub pipe will be disposed at a respective different one of the plurality of angles relative to the axial length of the outlet stub pipe, and
    wherein the wall is suitable for the other inlet stub pipe to be connected to the wall of the joining portion by boring a second hole through the wall at any one of the second positions and bonding the end of the other inlet stub pipe thereto.

5. A connector according to claim 1, wherein the connector further comprises an inspection riser extending upwardly from the chamber.

6. A connector according to claim 5, wherein the outlet stub pipe and the inspection riser define the only apertures in the chamber before the hole is made.

7. A connector according to claim 1, wherein the wall is a formed of a single piece of molded plastics.

8. A connector according the claim 2, wherein the first plurality of positions comprise a continuous range of positions in the at least one substantially horizontal plane.

9. A connector according to claim 1 wherein the curved end surface of the inlet stub pipe has a single radius.

10. An underground system for transporting waste water, said system comprising:
    the connector claimed in claim 1, wherein the first pipe is connected to the inlet stub pipe, the inlet stub pipe is connected to the wall at the position so as to position the inlet stub pipe at the desired angle relative to the outlet stub pipe, and the second pipe is connected to the outlet stub pipe.

11. A method of connecting underground pipes comprising:
    determining an orientation of an outlet pipe from a lowermost point of a chamber so that liquid will flow from the chamber into the outlet pipe under gravity in use;
    determining a first orientation of a first inlet pipe that will connect to a spherical or part-spherical joining portion of the chamber so that liquid will flow through the first inlet pipe under gravity into the chamber in use;
    determining a second orientation of a second inlet pipe that will connect to the joining portion so that liquid will flow through the second inlet pipe under gravity into the chamber in use;
    determining a first position on the joining portion for the first inlet pipe to be connected such that the first inlet pipe will be at a first desired angle to the outlet pipe in use, wherein the first desired angle is one of a plurality of possible angles allowed for by the shape of the joining portion;
    determining a second position on the joining portion for the second inlet pipe to be connected such that the second inlet pipe will be at a second desired angle to the outlet pipe in use, wherein the second desired angle is one of a plurality of possible angles allowed for by the shape of the joining portion;
    boring a first hole in a wall of the joining portion at the first position;
    boring a second hole in the wall of the joining portion at the second position;
    bonding the first inlet pipe to the wall about the first hole so that a curved end surface of the first inlet pipe fits flush with the wall and so that when the first inlet pipe and outlet pipe are installed underground liquid will flow through the first inlet pipe into the chamber under gravity and the first inlet pipe is at the first desired angle to the outlet pipe; and bonding the second inlet pipe to the wall about the second hole so that a curved end surface of the second inlet pipe fits flush with the wall and so that when the second inlet pipe is installed underground liquid will flow through the second inlet pipe into the chamber under gravity and the second inlet pipe is at the second desired angle to the outlet pipe.

12. A method of connecting underground pipes comprising:

determining an orientation of an outlet pipe from a lowermost point of a chamber so that liquid will flow from the chamber into the outlet pipe under gravity in use;

determining an orientation of an inlet pipe that will connect to a spherical or part-spherical joining portion of the chamber so that liquid will flow through the inlet pipe under gravity into the chamber in use;

determining a position on the joining portion for the inlet pipe to be connected such that the inlet pipe will be at a desired angle to the outlet pipe in use, wherein the desired angle is one of a plurality of possible angles allowed for by the shape of the joining portion;

boring a hole in a wall of the joining portion at the position;

bonding the inlet pipe to the wall about the hole so that a curved end surface of the inlet pipe fits flush with the wall and so that when the inlet pipe and outlet pipe are installed underground liquid will flow through the inlet pipe into the chamber under gravity and the inlet pipe is at the desired angle to the outlet pipe.

13. A method according to claim 12 wherein the inlet stub pipe is bonded to the wall at the position so that liquid will flow down an interior of the wall into the outlet stub pipe in use.

* * * * *